United States Patent
Malkin et al.

(10) Patent No.: US 8,015,270 B2
(45) Date of Patent: Sep. 6, 2011

(54) REDUNDANT APPLIANCE CONFIGURATION REPOSITORY IN STANDARD HIERARCHICAL FORMAT

(75) Inventors: Kirill Malkin, Morris Plains, NJ (US); Mikhail Litvin, Rockaway, NJ (US)

(73) Assignee: RELDATA, Inc., Parsippany, NJ (US)

( * ) Notice: Subject to any disclaimer, the term of this patent is extended or adjusted under 35 U.S.C. 154(b) by 369 days.

(21) Appl. No.: 11/470,550

(22) Filed: Sep. 6, 2006

(65) Prior Publication Data

US 2007/0067449 A1     Mar. 22, 2007

Related U.S. Application Data

(60) Provisional application No. 60/714,426, filed on Sep. 6, 2005.

(51) Int. Cl.
G06F 15/177 (2006.01)
G06F 17/00 (2006.01)

(52) U.S. Cl. .......... 709/221; 715/234
(58) Field of Classification Search .......... 709/221; 715/234
See application file for complete search history.

(56) References Cited

U.S. PATENT DOCUMENTS

| | | | |
|---|---|---|---|
| 6,697,805 B1 * | 2/2004 | Choquier et al. | 707/10 |
| 6,725,262 B1 * | 4/2004 | Choquier et al. | 709/221 |
| 6,745,208 B2 * | 6/2004 | Berg et al. | 1/1 |
| 6,959,329 B2 * | 10/2005 | Thakor | 709/220 |
| 7,035,847 B2 * | 4/2006 | Brown et al. | 1/1 |
| 7,111,059 B1 * | 9/2006 | Garcea et al. | 709/224 |
| 7,317,907 B2 * | 1/2008 | Linkert et al. | 455/412.1 |
| 7,373,586 B2 * | 5/2008 | Abe et al. | 715/200 |
| 7,529,726 B2 * | 5/2009 | Teng et al. | 1/1 |
| 7,680,905 B1 * | 3/2010 | Roberts et al. | 709/220 |
| 7,693,976 B2 * | 4/2010 | Perry et al. | 709/223 |
| 2003/0046370 A1 * | 3/2003 | Courtney | 709/220 |
| 2003/0167446 A1 * | 9/2003 | Thomas | 715/513 |
| 2006/0026168 A1 * | 2/2006 | Bosworth et al. | 707/10 |
| 2006/0092861 A1 * | 5/2006 | Corday et al. | 370/256 |
| 2007/0067449 A1 * | 3/2007 | Malkin et al. | 709/224 |
| 2009/0077138 A1 * | 3/2009 | Davis et al. | 707/201 |

* cited by examiner

Primary Examiner — George C Neurauter, Jr.
(74) Attorney, Agent, or Firm — Wayne F. Reinke, Esq.; Heslin Rothenberg Farley & Mesiti P.C.

(57) ABSTRACT

A configuration of a first storage resource is written to a first instance of a single file in a standard hierarchical format that is stored locally in nonvolatile memory and updatable by the first resource. A configuration of a second storage resource is written to a second instance of the single file in the standard hierarchical format stored locally in nonvolatile memory and updatable by the second resource. The first instance and second instance of the single file are updated so that all configurations are present and identical in all instances of the single file.

51 Claims, 1 Drawing Sheet

REDUNDANT APPLIANCE CONFIGURATION REPOSITORY IN STANDARD HIERARCHICAL FORMAT

CROSS-REFERENCE TO RELATED APPLICATIONS

This application claims priority under 35 U.S.C. §119 to U.S. Provisional Application No. 60/714,426, filed Sep. 6, 2005, which is herein incorporated by reference in its entirety.

This application contains subject matter which is related to the subject matter of the following applications, each of which is assigned to the same assignee as this application and filed on the same day as this application. Each of the below listed applications is hereby incorporated herein by reference in its entirety:

U.S. patent application Ser. No. 11/470,551, by Kirill Malkin, entitled "STORAGE RESOURCE SCAN".

U.S. patent application Ser. No. 11/470,548, by Malkin et al., entitled "LIGHTWEIGHT MANAGEMENT AND HIGH AVAILABILITY CONTROLLER".

U.S. patent application Ser. No. 11/470,545, by Kirill Malkin, entitled "BLOCK SNAPSHOTS OVER iSCSI".

U.S. patent application Ser. No. 11/470,544, by Kirill Malkin, entitled "GENERATING DIGEST FOR BLOCK RANGE VIA iSCSI".

U.S. patent application Ser. No. 11/470,542, by Kirill Malkin, entitled "INCREMENTAL REPLICATION USING SNAPSHOTS".

U.S. patent application Ser. No. 11/470,537, by Kirill Malkin, entitled "PERFORMANCE IMPROVEMENT FOR BLOCK SPAN REPLICATION".

U.S. patent application Ser. No. 11/470,539, by Dmitry Fomichev, entitled "REUSING TASK OBJECT AND RESOURCES".

BACKGROUND OF THE INVENTION

1. Technical Field

The present invention generally relates to configuration redundancy among like resources on a network. More particularly, the present invention relates to configuration redundancy for like resources on a network by tracking configurations in a distributed file across the resources involved.

2. Background Information

It has been found useful to keep track of the configuration settings for various network resources, for example, network storage appliances. For example, if a given resource fails, a replacement can be provided and configured quickly if the configuration of the failed one is stored and easily accessible. In the case of network storage appliances, configuration settings are frequently stored in nonvolatile memory, such as, for example, compact flash or a USB stick. The nonvolatile nature of the memory provides consistency of the configuration across power cycles.

However, storing the configuration in such nonvolatile memory poses problems when the resource fails. In order to attempt to restore the configuration, the nonvolatile memory would need to be taken to another like operational resource on the network for reading and retrieval of the failed resource's configuration. Such a scenario reduces system performance.

Thus, a need exists for a faster way to access configuration information for system resources on a network.

SUMMARY OF THE INVENTION

Briefly, the present invention satisfies the need for a faster way to access configuration information for system resources on a network by storing configurations for a plurality of system resources in a single repository in a standard hierarchical format that is accessible to the each of the plurality of system resources.

In accordance with the above, it is an object of the present invention to provide a unified way to access configurations for system resources.

The present invention provides, in a first aspect, a method of maintaining configuration files for a plurality of resources on a network. The method comprises writing to a first storage resource coupled to a first network resource of a plurality of network resources and storing a first instance of a single electronic file in a standard hierarchical format a configuration of the first network resource to a first portion of the first instance, wherein the first portion is modifiable by the first network resource and none other of the plurality of network resources. The method further comprises writing to a second storage resource coupled to a second network resource of the plurality of network resources and storing a second instance of the single electronic file in the standard hierarchical format a configuration of the second network resource to a second portion of the second instance, wherein the second portion is modifiable by the second network resource and none other of the plurality of network resources, and synchronizing the first instance and the second instance such that the configuration of the first network resource and the configuration of the second network resource are in both the first instance and the second instance of the single electronic file. The method further comprises modifying, after the synchronizing, at least one of the first portion of the first instance of the single electronic file by the first network resource and the second portion of the second instance of the single electronic file by the second network resource, and repeating the synchronizing after the modifying.

The present invention provides, in second and third aspects, system and program product for maintaining configuration files for a plurality of like resources on a network based on a set of rules, corresponding to the method of the first aspect.

These, and other objects, features and advantages of this invention will become apparent from the following detailed description of the various aspects of the invention taken in conjunction with the accompanying drawings.

DETAILED DESCRIPTION OF THE INVENTION

Figure 1:
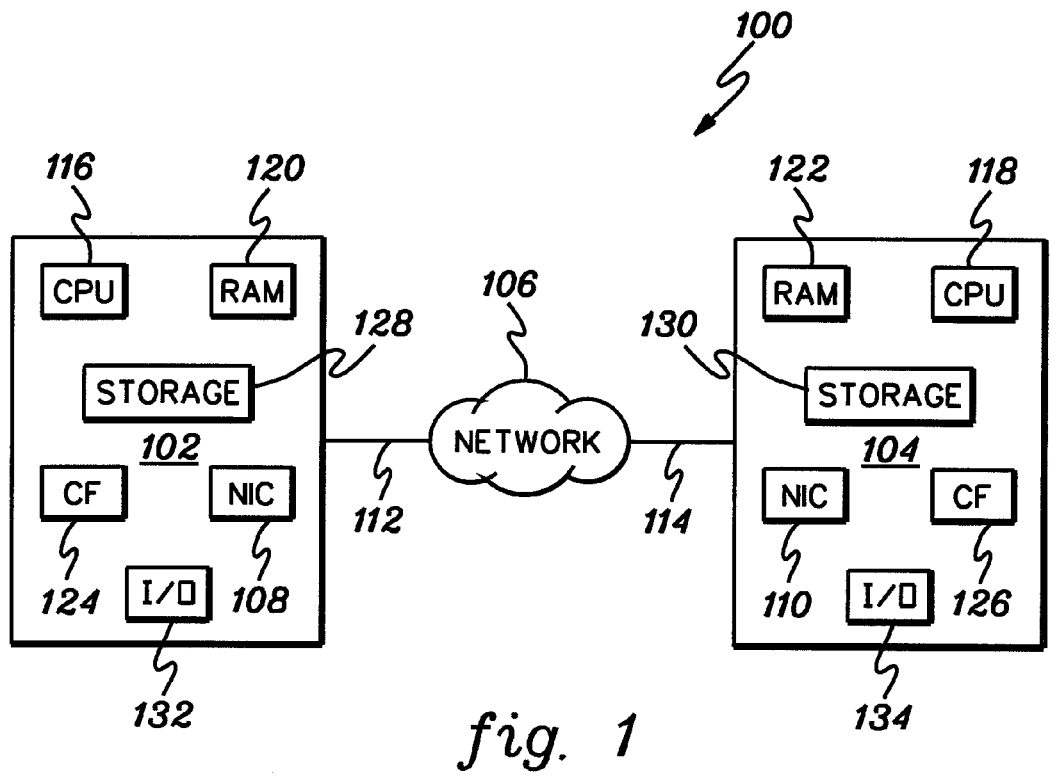
FIG. 1 depicts an example of two storage appliances coupled to a network operating in accordance with an aspect of the present invention.

FIG. 1 depicts a network 100 comprising a first network storage appliance 102 and a second network storage appliance 104. The storage appliances are coupled to the rest of the network 106 by some form of network connection, for example, by gigabit Ethernet via network interface cards 108 and 110, and cables 112 and 114. The storage appliances also each comprise at least one CPU (116 and 118), random access memory (120 and 122), nonvolatile local storage in the form of a compact flash card (124 and 126), and of course network accessible data storage (128 and 130). Input to and output from the appliances to an operator is provided through I/O (132 and 134), for example, a screen and input mechanism (e.g., buttons or a navigation/select mechanism, such as keyboard or keyboard and mouse).

As one skilled in the art will understand, network storage appliances 102 and 104 are essentially limited purpose generic computing devices. Stored in storage 128 and 130 is an operating system, for example, UNIX or a UNIX derivative, preferably LINUX or a customized version of LINUX, along with one or more software programs held in storage that, together with the operating system and CPU, control the operation of the storage appliance. Each appliance is capable of generating, parsing and modifying files in a standard hierarchical format described in more detail below.

Figure 2:
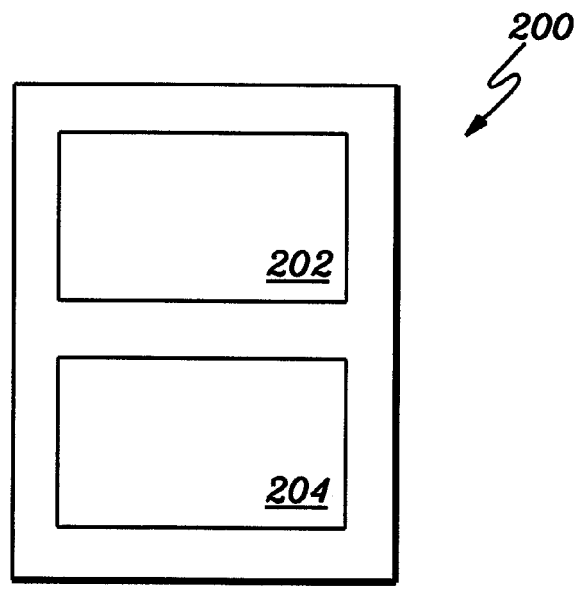
FIG. 2 depicts an example of a file comprising configurations for the two storage appliances of FIG. 1.

The operation of the network storage appliances in accordance with the present invention will now be described with reference to FIGS. 1 and 2. Assume that the storage appliances are part of a cluster with peer-to-peer communications between members of the cluster. On startup of each of the network storage appliances, a control program stored in storage 128 and 130 causes the respective appliance to obtain a single file (e.g., file 200) stored in the respective compact flash. The locally stored single file is in a standard hierarchical format and contains a section for each of the appliances (e.g., sections 202 and 204), each section containing a configuration for the respective appliance. Each configuration has a version (e.g., version number) that is updated whenever a modification to the configuration is made. Except during synchronization, each appliance can only modify its own configuration section in the local instance of the single file. When a given appliance in the cluster is communicating with another, it can receive the configuration of the other, and replace the section of its own standard hierarchical format single file corresponding to the other appliance's configuration. Similarly, the other appliance can receive and replace the configuration for the given appliance.

As noted above, the single file for the configurations is in a standard hierarchical format. Any standard hierarchical format now known or later developed can be used, so long as it has (or can be made to have) a flexible and extensible hierarchical data organization with hierarchically interconnected (e.g., nested) nodes (e.g., objects), each node having attributes or properties. A strong hierarchy allows for specifying multiple configurations and for easily introducing diverse nodes, without complicating the navigation of the file. Perhaps the best currently known example of such a standard hierarchical format, and the preferred format, is XML. Another example is the "ini" format, though well-known "tricks" to allow for nesting would need to be applied. For example, since the beginning of the next section is also the end of the previous, i.e., no breaks, nesting can be simulated by declaring subsections and paragraphs in the following manner: [section-name.subsection-name.paragraph . . . ]. While the "ini" format is not preferred, and can quickly become unruly with nesting, in theory it could be used.

Returning now to the operational description, after placing a copy of the single file in RAM (e.g., appliance 102 placing a copy of the file from compact flash 124 into RAM 120), the storage appliances parse their respective section and configure themselves accordingly During operation of the system appliances, the configurations may change. Whenever a configuration is modified by an appliance, the modified single file is written locally back to compact flash. This may also be done at predetermined intervals. Whenever a configuration is modified, and preferably at predetermined intervals as well, the appliances compare versions for all configurations and update as necessary. In other words, the various instances of the single file are synchronized across the network resources involved. Synchronization can be done in any number of ways from simple copying to the more complex example provided below. The configurations migrate to other instances, so that all become identical and include all configurations for all members of the group.

One example of synchronizing the single configuration files of the appliances in the cluster will now be provided. Each portion of the file that represents the configuration of an appliance is versioned. When the appliance changes its own configuration, the version is updated, for example, incremented. During a communication session, the communicating appliances compare the version of their own configuration in their local configuration file to that stored in the peer appliance. Normally, the version stored locally would be equal to or greater than the version at the peer. If it is equal, there is no need to replace the configuration. If it is greater, then the configuration is sent to the peer, and it should replace the corresponding portion in its XML. This approach can be thought of as each appliance updating its own configuration everywhere.

The appliances launch communication sessions based on, for example, a modified round-robin algorithm. Each appliance tries to establish a session with all other N-1 appliances in the cluster. If during the round-robin pass, appliance i detects that is has already communicated with appliance j, i.e. j contacted i before i contacted j, then it skips to the next appliance (j+1). That way, appliance i is guaranteed that all appliances communicate, but no communication occurs twice during a given pass.

The description above assumes that both appliances 102 and 104 have previously been joined to the group. Joining an appliance to a group can be accomplished, for example, manually by an administrator via the appliance itself through input/output means, or via a computing unit coupled to the appliance, either local or remote. The joining is preferably not handled in an automated fashion via software for security reasons, however, it could be. Such a manual configuration includes, for example, assigning the group name to the new appliance, and either providing the new appliance with the portal information (IP address and port) of any of the existing members of the group, or one of the members is provided with portal information of the new appliance. The appliance may then be "discovered" by the group and manually or automatically accepted as a member.

A new appliance is assumed to come from the factory with at least a template configuration stored in its compact flash, which is completed by an operator and loaded into RAM, after which the appliance configures itself. There is then a forced synchronization session so that all members of the group have an updated configuration file that includes the new member. A similar scenario takes place upon removing an appliance from the group; that is, an appliance is removed and a forced synchronization session takes place.

Where an appliance is the first one in a group, there is no group to recognize it. Thus, the appliance should have the capability to start a new configuration group with only its own configuration to be placed in the configuration repository.

It should be noted that top levels of the configuration hierarchy in the configuration repository (the single file) include identification information, such as, for example, group name, time of creation, and appliance serial number. This information helps to resolve conflicts in the case of, for example, duplicate group names, or previously in-synch configurations become out-of-synch (e.g., due to a loss of connectivity). In such a case, the configurations having matching identification information can automatically be resynchronized, and configurations that have different identification information can, for example, be resynchronized manually.

Although the example described herein includes resources of a same type, i.e., network storage resources, with identical functions, it will be understood that the resources need not be of the same type, or, if the same type, need not have identical functions. Of course, all resources included in the single file need to be able to synchronize configurations according to a common algorithm. In addition, a resource of one type will typically not be able to run a configuration for another type of resource, but can still maintain a configuration therefor.

The above-described computing environment and/or computing units are only offered as examples. The present invention can be incorporated and used with many types of computing units, computers, processors, nodes, systems, work stations and/or environments without departing from the spirit of the present invention. Additionally, while some of the embodiments described herein are discussed in relation to network storage appliances, such embodiments are only examples. Other types of network resources and computing environments can benefit from the present invention and, thus, are considered a part of the present invention.

The present invention can include at least one program storage device readable by a machine, tangibly embodying at least one program of instructions executable by the machine to perform the capabilities of the present invention. The program storage device can be provided separately, or as a part of a computing unit.

The figures depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of maintaining configuration files for a plurality of resources on a network, the method comprising:

writing to a first storage resource coupled to a first network resource of a plurality of network resources and storing a first instance of a single electronic file in a standard hierarchical format a configuration of the first network resource to a first portion of the first instance, wherein the first portion is modifiable by the first network resource and none other of the plurality of network resources;

writing to a second storage resource coupled to a second network resource of the plurality of network resources and storing a second instance of the single electronic file in the standard hierarchical format a configuration of the second network resource to a second portion of the second instance, wherein the second portion is modifiable by the second network resource and none other of the plurality of network resources;

synchronizing the first instance and the second instance such that the configuration of the first network resource and the configuration of the second network resource are in both the first instance and the second instance of the single electronic file;

modifying, after the synchronizing, at least one of the first portion of the first instance of the single electronic file by the first network resource and the second portion of the second instance of the single electronic file by the second network resource; and repeating the synchronizing after the modifying.

2. The method of claim 1, wherein writing to the first storage resource comprises writing to first nonvolatile storage, and wherein writing to the second storage resource comprises writing to second nonvolatile storage.

3. The method of claim 1, wherein the repeating is performed whenever a modification is made to an instance of the single electronic file.

4. The method of claim 1, wherein repeating the synchronizing is performed at a predetermined time.

5. The method of claim 1, wherein the standard hierarchical format comprises XML.

6. The method of claim 1, wherein the first network resource and the second network resource are a same type of resource.

7. The method of claim 6, wherein the first network resource and second network resource each comprise a network storage resource.

8. The method of claim 6, wherein the standard hierarchical format comprises XML.

9. The method of claim 8, wherein writing to the first storage resource comprises writing to first nonvolatile storage, and wherein writing to the second storage resource comprises writing to second nonvolatile storage.

10. The method of claim 9, wherein repeating the synchronizing is performed at least one of whenever a modification is made to an instance of the single electronic file and at a predetermined time.

11. The method of claim 1, wherein the configuration of the first network resource includes a first version number, wherein the configuration of the second network resource includes a second version number, the method further comprising updating at least one of the configurations and the version numbers by the corresponding network resource.

12. The method of claim 11, wherein the synchronizing comprises comparing version numbers for a given network resource in the first instance and second instance and replacing the corresponding configuration with a highest version if the version numbers are different.

13. The method of claim 1, further comprising, prior to the writing and the synchronizing, joining the first network resource and the second network resource to a group.

14. The method of claim 13, wherein the joining is performed at least in part manually.

15. The method of claim 13, further comprising:

removing at least one of the first network resource and the second network resource from the group; and synchronizing the first instance and the second instance of the single electronic file.

16. The method of claim 1, wherein each of the first instance and the second instance include at least one item of identifying information, and wherein the synchronizing comprises:

comparing the at least one item of identifying information from the first instance and the second instance; and resolving any conflict therebetween.

17. The method of claim 16, wherein the first network resource and second network resource are members of a group, and wherein the at least one item of identifying information comprises at least one of a group name, a time of creation for the single electronic file and the serial numbers for the first network resource and the second network resource.

18. A system for maintaining configuration files for a plurality of resources on a network, the system comprising:
 a first storage resource coupled to a first network resource of a plurality of network resources and storing a first instance of a single file in a standard hierarchical format, the single file comprising a configuration of the first network resource in a first portion thereof, wherein the first portion is modifiable by the first network resource and none other of the plurality of network resources;
 a second storage resource coupled to a second network resource of the plurality of network resources and storing a second instance of a single file in a standard hierarchical format, the single file comprising a configuration of the second network resource in a second portion thereof, wherein the second portion is modifiable by the second network resource and none other of the plurality of network resources;
 at least one computing device coupled to the first storage resource and the second storage resource and programmed to synchronize the first instance and the second instance such that the configuration of the first network resource and the configuration of the second network resource are in both the first instance and the second instance of the single electronic file; and
 wherein at least one of the first portion of the first instance of the single electronic file is modified by the first network resource and the second portion of the second instance of the single electronic file is modified by the second network resource; and
 wherein the computing device is further programmed to repeat the synchronizing after the modifying.

19. The system of claim 18, wherein the at least one computing device is programmed to repeat the synchronizing whenever a modification is made to either instance.

20. The system of claim 18, wherein the at least one computing device is programmed to repeat the synchronizing at a predetermined time.

21. The system of claim 18, wherein the standard hierarchical format comprises XML.

22. The system of claim 18, wherein the first network resource and the second network resource are a same type of network resource.

23. The system of claim 22, wherein the first network resource and second network resource each comprise a network storage resource.

24. The system of claim 22, wherein the standard hierarchical format comprises XML.

25. The system of claim 24, wherein the first storage resource comprises a first nonvolatile storage resource, and wherein the second storage resource comprises a second nonvolatile storage resource.

26. The system of claim 24, wherein the at least one computing device is programmed to repeat the synchronizing whenever a modification is made to either instance or at a predetermined time.

27. The system of claim 18, wherein the configuration of the first network resource includes a first version number, wherein the configuration of the second network resource includes a second version number the method further comprising updating at least one of the configurations and the version numbers by the corresponding network resource.

28. The system of claim 27, wherein the synchronizing comprises comparing version numbers for a given network resource in the first instance and second instance and replacing the corresponding configuration with a highest version if the version numbers are different.

29. The system of claim 18, wherein the computing device is further programmed to effect, prior to the synchronizing, joining the first network resource and the second network resource to a group.

30. The system of claim 29, wherein the joining is performed at least in part manually.

31. The system of claim 29, wherein the computing device is further programmed to effect:
 removing at least one of the first network resource and the second network resource from the group; and
 synchronizing the first instance and the second instance of the single electronic file.

32. The system of claim 18, wherein each of the first instance and the second instance include at least one item of identifying information, and wherein the synchronizing comprises:
 comparing the at least one item of identifying information from the first instance and the second instance; and
 resolving any conflict therebetween.

33. The system of claim 32, wherein the first network resource and second network resource are members of a group, and wherein the at least one item of identifying information comprises at least one of a group name, a time of creation for the single electronic file and the serial numbers for the first network resource and the second network resource.

34. The system of claim 18, wherein the first storage resource comprises a first nonvolatile storage resource, and wherein the second storage resource comprises a second nonvolatile storage resource.

35. At least one program storage device readable by a computing device and storing thereon at least one program of instructions executable by the computing device to perform a method of maintaining configuration files for a plurality of resources on a network, the method comprising:
 writing to a first storage resource coupled to a first network resource of a plurality of network resources and storing a first instance of a single electronic file in a standard hierarchical format a configuration of the first network resource to a first portion of the first instance, wherein the first portion is modifiable by the first network resource and none other of the plurality of network resources;
 writing to a second storage resource coupled to a second network resource of the plurality of network resources and storing a second instance of the single electronic file in the standard hierarchical format a configuration of the second network resource to a second portion of the second instance, wherein the second portion is modifiable by the second network resource and none other of the plurality of network resources;
 synchronizing the first instance and the second instance, such that the configuration of the first network resource and the configuration of the second network resource are in both the first instance and the second instance of the single electronic file;
 modifying, after the synchronizing, at least one of the first portion of the first instance of the single electronic file by the first network resource and the second portion of the second instance of the single electronic file by the second network resource; and
 repeating the synchronizing after the modifying.

36. The at least one program storage device of claim 35, wherein writing to the first storage resource comprises writing to first nonvolatile storage, and wherein writing to the second storage resource comprises writing to second nonvolatile storage.

37. The at least one program storage device of claim 35, wherein the repeating is performed whenever a modification is made to an instance of the single electronic file.

38. The at least one program storage device of claim 35, wherein repeating the synchronizing is performed at a predetermined time.

39. The at least one program storage device of claim 35, wherein the standard hierarchical format comprises XML.

40. The at least one program storage device of claim 35, wherein the first network resource and the second network resource are a same type of network resource.

41. The at least one program storage device of claim 40, wherein the first network resource and second network resource each comprise a network storage resource.

42. The at least one program storage device of claim 40, wherein the standard hierarchical format comprises XML.

43. The at least one program storage device of claim 42, wherein writing to the first storage resource comprises writing to first nonvolatile storage, and wherein writing to the second storage resource comprises writing to second nonvolatile storage.

44. The at least one program storage device of claim 43, wherein repeating the synchronizing is performed at least one of whenever a modification is made to an instance of the single electronic file and at a predetermined time.

45. The at least one program storage device of claim 35, wherein the configuration of the first network resource includes a first version number, wherein the configuration of the second network resource includes a second version number the method further comprising updating at least one of the configurations and the version numbers by the corresponding network resource.

46. The at least one program storage device claim 45, wherein the synchronizing comprises comparing version numbers for a given network resource in the first instance and second instance and replacing the corresponding configuration with a highest version if the version numbers are different.

47. The at least one program storage device of claim 35, further comprising, prior to the writing and the synchronizing, joining the first network resource and the second network resource to a group.

48. The at least one program storage device of claim 47, wherein the joining is performed at least in part manually.

49. The at least one program storage device of claim 47, further comprising:
removing at least one of the first network resource and the second network resource from the group; and
synchronizing the first instance and the second instance of the single electronic file.

50. The at least one program storage device of claim 35, wherein each of the first instance and the second instance include at least one item of identifying information, and wherein the synchronizing comprises:
comparing the at least one item of identifying information from the first instance and the second instance; and
resolving any conflict therebetween.

51. The at least one program storage device of claim 50, wherein the first network resource and second network resource are members of a group, and wherein the at least one item of identifying information comprises at least one of a group name, a time of creation for the single electronic file and the serial numbers for the first network resource and the second network resource.

* * * * *